July 28, 1925. 1,547,633
V. H. WENZL
SLED
Filed Jan. 26, 1923 2 Sheets-Sheet 1
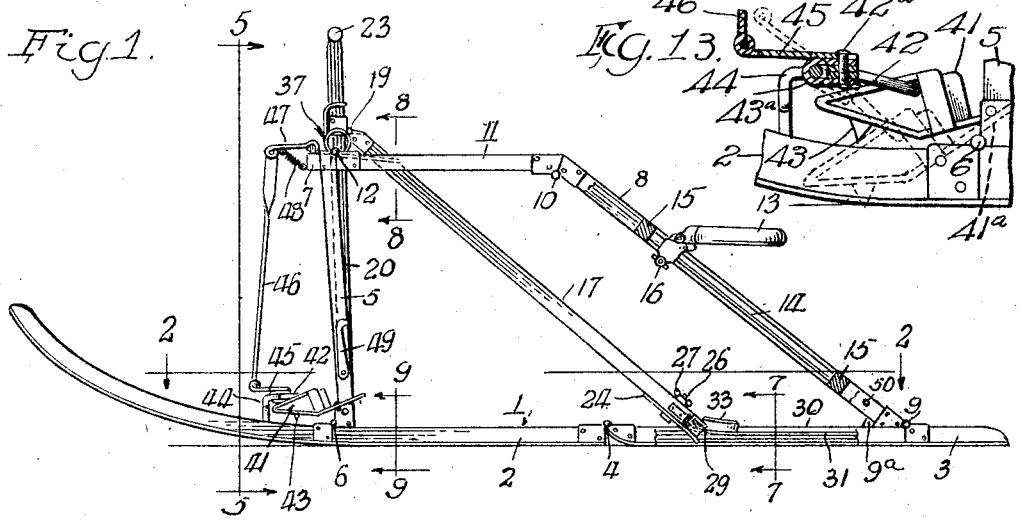
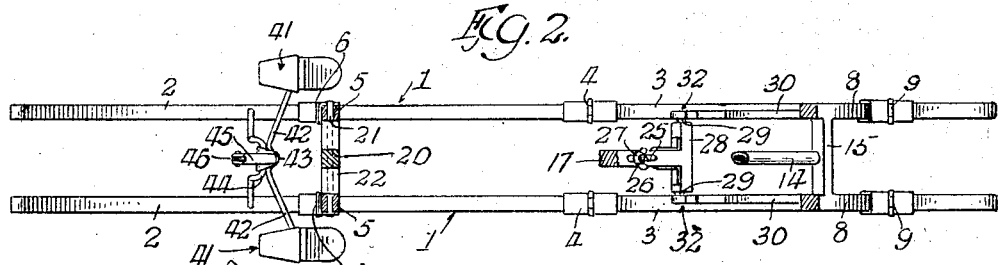
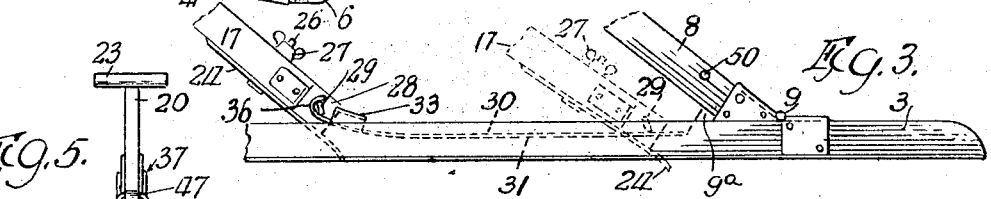
Inventor
Victor H. Wenzl
by [signature] Atty.

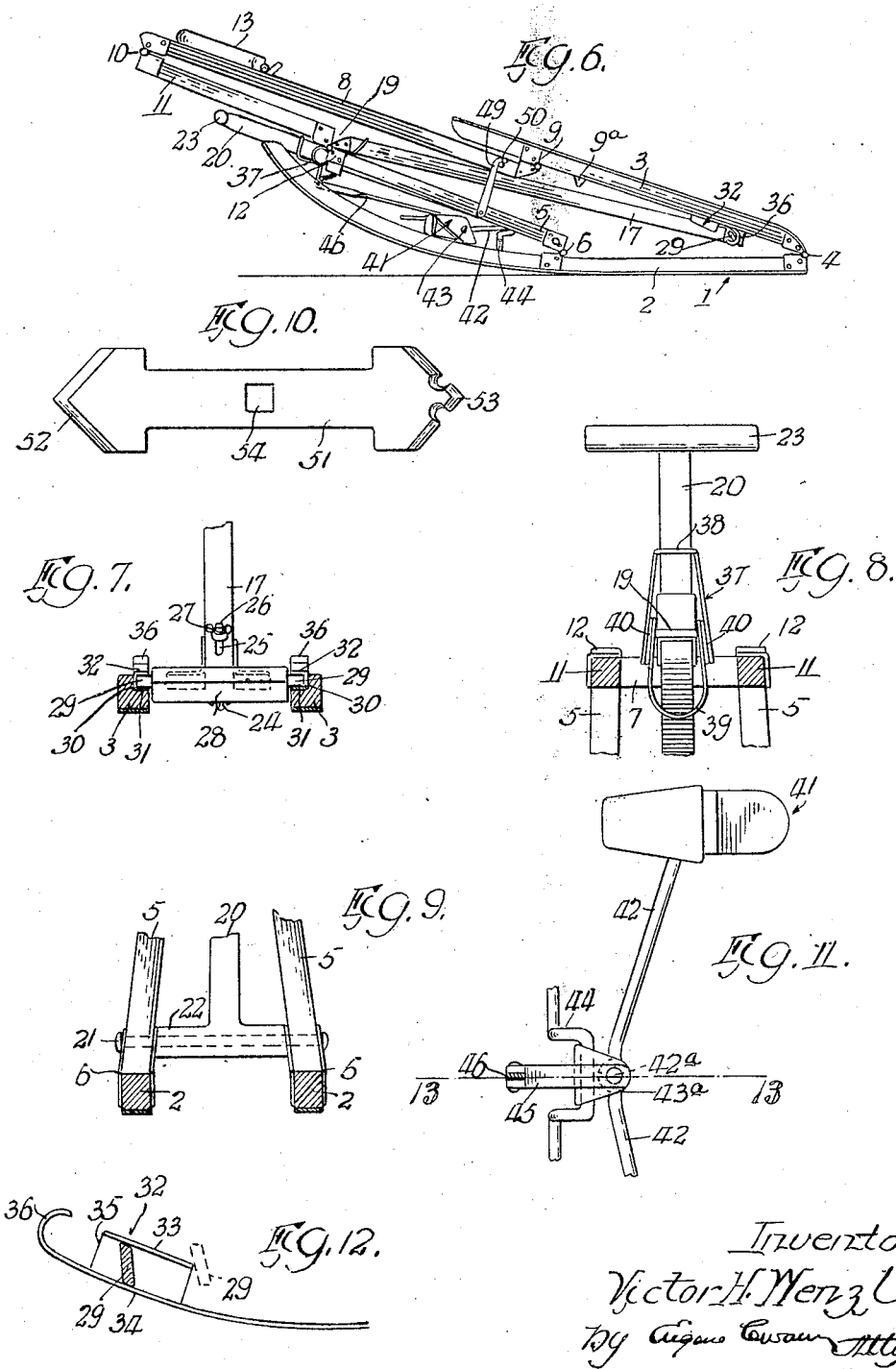

Patented July 28, 1925.

1,547,633

UNITED STATES PATENT OFFICE.

VICTOR H. WENZL, OF BUCHANAN, MICHIGAN.

SLED.

Application filed January 26, 1923. Serial No. 614,990.

*To all whom it may concern:*

Be it known that I, VICTOR H. WENZL, a citizen of the United States, residing at Buchanan, in the county of Berrien and State of Michigan, have invented new and useful Improvements in Sleds, of which the following is a specification.

This invention relates to sleds.

One object of my invention is to so construct the sled that it may be folded or collapsed into a relatively compact form and have its parts locked in that shape to facilitate storage and carrying to and from the place of use.

Another object of my invention is to provide a propulsion mechanism which may be conveniently and easily operated by the rider on the sled to propel the same over ice or snow.

A further object of my invention is to have the propelling means grip or engage the ice or snow as it starts on its power stroke and remain so engaged during the entire stroke so that full and effective benefit of the same may be had.

A further object of my invention is to provide foot rests for the feet of the rider and to make the rests in such manner that they may be brought alternately into contact with the snow or ice over which the sled is moved for guiding purposes, or both be brought into contact with such surface for braking purposes.

The invention consists further in the matters hereinafter described and more particularly set forth in the appended claims.

In the accompanying drawings—

Fig. 1 is a side view of a sled constructed in accordance with my invention and set up ready for use;

Fig. 2 is a horizontal sectional view taken on line 2—2 of Fig. 1;

Fig. 3 is an enlarged fragmentary side view of one of the runners of the sled and illustrating the stroke of the propelling mechanism, the full and dotted lines, respectively, showing the push bar at the beginning and end of its stroke;

Fig. 4 is a similar view illustrating how said push bar is raised from contact with the underlying surface on the return stroke;

Fig. 5 is a vertical sectional view taken on line 5—5 of Fig. 1;

Fig. 6 is a view showing the sled folded or collapsed into compact form and with its parts locked in that shape;

Figs. 7, 8, and 9 are vertical detail sectional views taken on lines 7—7, 8—8, and 9—9, respectively, of Fig. 1;

Fig. 10 is a top plan view of a double ended spike plate which may be used on the push bar;

Figs. 11 and 12 are views of details of construction to be hereinafter more fully described; and Fig. 13 is a vertical sectional view taken on line 13—13 of Fig. 11.

The sled of my invention comprises two substantially parallel runners 1, 1, of the same length and with their front ends curved upward, as shown in Fig. 1. Said runners are arranged substantially close together, and each is divided into front and rear parts or sections 2, 3 connected together at their meeting ends by a hinge 4. The rear sections 3 are shorter than the front ones 2 and by the hinges 4 may be swung forward over the front sections when folding or collapsing the sled into compact form, as shown in Fig. 6.

Mounted on the runners 1, 1 is a framework comprising a pair of forward members 5, 5, which extend substantially upright when the sled is set up for use, as shown in Figs. 1, 2, and 5. Said members 5, 5 have the same length and are connected at their lower ends to the front runner sections 2, 2 intermediate the ends thereof by hinges 6, 6 constructed and arranged so that the members 5, 5 may be folded forward onto the curved front ends of said sections when collapsing the sled. The members 5, 5 are connected together at their outer ends by a crosspiece 7, as shown in Figs. 5 and 8. The lower ends of said members 5, 5, in the particular form of sled shown in the drawings, are preferably made blunt to seat against the runners 1, 1 when the sled is upright and thus relieve the hinges 6, 6 of as much strain as possible.

The rear part of this frame consists of a pair of rear members 8, 8, which have their lower ends connected by hinges 9, 9 with the rear runner sections 3, 3 adjacent the rear ends of the latter. When the sled is set up for use, these rear members 8, 8 are inclined upward and forward toward the front members 5, 5 and have their upper ends connected by hinges 10 with forwardly extending side members 11, 11, which are substantially horizontal at this time. These side members 11, 11 extend forward to the upper ends of the upright members 5, 5 and are connected therewith by hinges 12, 12. These hinges are on top of the members 11 and 5, respectively, so that the former may swing to a position forward of the latter and be in substantial alignment therewith when the sled is collapsed or folded, as shown in Fig. 6.

The forward and rear ends of the side members 11, 11, when the sled is set up for use, abut against the upper ends of the members 5 and 8, respectively, while the lower ends of the latter are shaped to fit against the upper faces of the rear runner sections 3, 3, and against stop blocks 9ª, 9ª on said inner sections, to provide a rigid and strong framework to support the weight of the rider when on the seat 13. Said seat 13 is carried by the rear members 8, 8, and it is hinged thereto so that it may be folded up against said members when the sled is collapsed, as shown in Fig. 6.

Said seat 13 may be made vertically adjustable so as to accommodate riders of different heights. This may be accomplished by providing between the members 8, 8, a rod 14 having its ends fixed to cross-pieces 15, 15 carried by said members 8. Encircling this rod 14 is a split clamp 16 carried by the seat 13.

For propelling the sled over the ice and snow, I provide a propulsion mechanism as follows. Arranged between the members forming the framework described is a push bar 17. This has its upper end connected by a hinge 19 with an operating rod 20. The latter has its lower end connected with the members 5, 5, and between them, by a pivot rod 21 extending through said members 5, 5 and a cross-piece 22 carried by said rod 20. The upper end of the rod 20 extends above the side members 11 and there has a cross-handle 23 to permit grasping said rod and swinging it back and forth to actuate the push bar 17.

The lower end of the push bar 17 is free and there carries a steel or other metal plate 24 having a spiked end to engage the surface over which the sled is propelled. Said bar 17 has an elongated slot 25 through which a bolt 26 extends. By a winged or other nut 27 on said bolt, the plate 24 is adjustably clamped to the bar 17 to regulate the distance that its pointed or spiked end may be forced into the ice or snow and thus take care of either hard or soft surfaces.

A cross-member 28 is carried at the free or lower end of the bar 17 and the plate 24 extends below it, as shown. Said member 28 extends across the space between the runners 1, 1 and has lugs 29, 29 at its ends to work in grooves or guide-ways 30, 30 in the rear runner sections 3, 3. To take the wear off of these grooves, the same are faced with metal strips 31, 31.

In the particular form of device shown in the drawings, the grooves 30 terminate at their rear ends short of the stop blocks 9ª, while their forward ends continue into channel shaped metal housings 32, 32, one on each runner as shown. These housings have top walls 33, bottom walls 34, and upright walls 35 on the outside only, as shown in Figs. 7 and 12. The channels formed by these housings are open at both ends and also open inwardly. The bottom walls 34 continue on forward of the channels formed by the top and bottom walls (Fig. 12) and terminate in hook shaped members 36. These in effect constitute the extreme forward ends of the guide-ways 30 and prevent the lugs 29 from being swung out of the grooves at the forward end of the stroke. These hooks also prevent the lugs 29 from dropping away from the grooves 30 when the sled is folded up into compact form as shown in Fig. 6. Thus when the sled is opened or set up for use, the lugs 29 are at the forward ends of the grooves and ready for the propulsion stroke.

To yieldably hold the lugs 29 in the grooves, I provide a spring device 37 (Fig. 8) having one end looped as at 38 about the rear side of the operating rod 20 and its other end looped as at 39 about the upper side of the push bar 17 with coiled portions 40, 40 between and on opposite sides of these bars and at or adjacent the hinge 19 so that the normal tension of the spring is in a direction to hold the lugs 29 in the grooves 30 and thus prevent them from accidentally jumping out of the same during the operation of the device.

The rider, when on the sled, straddles the framework described and places his feet on a pair of foot rests 41, 41. These are arranged just forward of the members 5, 5 on opposite sides of the runners 1, 1, and outside of the same when the sled is set up for use, as best shown in Figs. 2 and 5. The rests 41, 41 are connected together by means extending between them and over the runners 1, 1, as shown. This means is made in two rod parts 42, 42, and the foot rests 41, 41 are pivotally carried thereby on their outer ends so that they may be rocked forward and backward to bring the spurs 43, 43 on the forward portions of the rests alternately into and out of contact with the underlying surface for steering purposes, or both be jammed into contact with such surface for braking purposes and stop the movement of the sled.

In order that these rests 41, 41 may be folded in over the forward runner sections 2, 2 when the sled is collapsed and thus be out of the way, the meeting ends of the rod parts 42, 42 are made I-shape and engage about a pivot pin 42$^a$ (Fig. 11) on a plate 43$^a$. This in turn is engaged about a yoke-shaped portion of a rod 44 extending across the runner sections 2, 2 above the same and fixed thereto. Secured to the plate 43$^a$ is a strap 45 extending forward when the device is set up, as shown in Figs. 1 and 11, and having the lower end of a rod 46 pivoted or hinged to it, as shown. The upper end of the rod 46 is hinged to a link 47, which in turn extends to and is hinged to the cross piece 7 at the upper ends of the members 5, 5. A spring 48 connects the link on its under side with said cross-piece 7, as shown in Fig. 1.

By the structure described, the spring 48 tends to hold the rod 46 upright when the parts are in position of use, and thus the foot rests 41, 41 are held extended and outside of the runners 1, 1, as shown in Fig. 2, and the pivoted pin 42$^a$ and rods 42 are on the rear side of the bar 44. As the sled is being collapsed, the downward movement of the members 5, 5 toward the front ends of the runners 1, 1 causes the plate 43$^a$, through the strap 45 and rod 46, to turn upward and forward toward the outer ends of the runners about the rod 44 and in front of the same. On reaching the latter position, the pivot pin 42$^a$ is lower than the rests 41 and, nothing to resist them, they move in toward each other and come to rest over the runners 1, 1 to be out of the way. When outside the runner 2, 2, the foot rests 41, 41, by the plate 43$^a$ looped about the fixed cross-bar 44, may be moved down close to the underlying surface for steering and braking purposes heretofore described. Fig. 13 shows how this is accomplished. The spring 48 at the upper end of the rod 46 tends to normally keep the rests 41, 41 in their lifted positions out of contact with the underlying support. This spring, however, is not sufficient to resist the downward pressure on the rests by the feet of the rider when engaged therewith. Pushing down on the rests rocks the plate 43$^a$ about the rod 44 and brings the heel pieces 41$^a$ into engagement with the underlying surface. These pieces are flat like runners and may readily slide over the snow or ice without retarding the movement of the sled. Said rests 41 are pivotally or rockably carried by the rods 42, and thus may be turned about the same to lift the heel pieces 41$^a$ and bring the spurs 43 into contact with the underlying surface for the braking and steering purposes mentioned, as shown by dotted lines in Fig. 13.

The action of the push bar 17 is as follows. At the beginning of the stroke, the bar 17 is in the position shown in full lines in Fig. 3 with the lugs 29, 29 at the hook members 36 and thus at the beginning of the grooves 30. At this time the spiked plate 24 is out of contact with the snow or ice, as the case may be, but moved into gripping engagement therewith as soon as the bar 17 is pushed downward and rearward by the rider on the sled drawing the rod 20 toward him. The bottom walls 34 of the metal housings 32 are inclined downward and rearward so that this may be accomplished. The lugs 29 at the initial part of the stroke when in contact with the underlying surface ride between the top and bottom walls 33, 34 of the housings 32, as shown in Fig. 12, and gain the gripping action necessary to propel the sled forward. The lugs 29 fit between these walls and the latter hold the lugs from releasing their grip on the underlying surface.

The spring 37 holds the spike in contact with the underlying surface throughout the full length of the stroke, until the bar 17 reaches the position approximating that shown in dotted lines in Fig. 3. On the return stroke, the spike slides freely over the underlying surface, until it reaches the housings 32. The lugs 29 are arranged at the angle shown so as to form a bevel to contact with the top walls 33 of the housings 32 and ride up over them to lift the spiked plate 24 from contact with said surface instead of going back through the channels of said housings. A continued forward movement carries the lugs 29 off of the top walls 33 and they drop into the hook members 36 for starting another stroke. This is repeated as often as the rider desires to propel the sled, and either long or short strokes or a combination thereof may be made at the will of the rider by his control through the actuating rod 20.

To fold up the sled, the seat supports 8, 8 are grasped and swung forward. This brings the runner sections 3, 3 on top of the members 8, 8, the latter on the side members 11, 11 and forward of the members 5, 5, as shown in Fig. 6. The members 5, 5 rest against the foot rests 41, 41 with the propulsion bar 17 in between them and held up at its free end by the hooks 36. To hold the parts collapsed, I provide at one side a hook 49 pivoted to one of the members 5 and engaging over a pin 50 on the adjacent seat support 8. When so locked, the sled may be carried to and from the place of use in compact form and thus be conveniently handled. To set up the sled, all that is necessary is to first unlock the hook 49 and move the framework backward and the parts will automatically unfold and take the positions of use, as shown in Fig. 1.

When used on hard ice, the spike need grip the surface only slightly. The plate 24 has a rather sharp and pronounced point, as shown in Fig. 7, and is designed for use more on soft ice and snow than on hard ice. In Fig. 10, I have shown a double pointed plate 51 having at one end a point 52 for hard ice and the other end a point 53 for softer ice and snow. The plate 51 is adjustably clamped to the bar 17 by a bolt 54 in the same manner as heretofore described.

While I have shown and described herein in detail a sled of my invention, it is of course to be understood that the details of construction and arrangement of parts may be variously changed and modified without departing from the spirit and scope of my invention.

I claim as my invention:

1. A sled, comprising runners, a rider support carried by said runners, said runners and support being formed of sections permitting the sled to be collapsed into compact form for carrying and packing, and a propulsion mechanism carried by the sled and formed to be opened up and collapsed therewith.

2. A sled, comprising laterally spaced runners, means thereon to support a rider and provided with a seat, a propulsion mechanism forward of said seat to propel said sled over an underlying surface, said mechanism including a push bar to engage said surface between said runners, grooves in said runners, a cross-member carried by said bar, lugs on said cross-member and riding in said grooves, and means associated with said grooves and acting on said lugs for lifting said bar out of engagement with said surface when the bar reaches the end of its return stroke, and for guiding the bar into engagement with said surface at the beginning of its propulsion stroke.

3. A sled, comprising laterally spaced runners, means thereon to support a rider and provided with a seat, a propulsion mechanism to propel the sled over an underlying surface, said mechanism including a push bar to engage said surface between said runners, grooves in said runners, a cross-member carried by said rod, lugs on said cross-member and riding in said grooves, and housing members at the forward ends of said grooves and having inclined bottom walls to guide the push bar into engagement with said surface at the beginning of its propulsion stroke, said housings having top walls in the path of movement of the lugs on the return stroke to raise the push bar out of contact with said surface, said housings having hook shaped ends as continuations of the bottom walls to prevent the lugs from being withdrawn from the forward ends of said grooves.

4. A sled, comprising laterally spaced runners, each formed of front and rear sections hinged together, and means on said runners to support a rider, said means embracing a framework of members hinged together and to the front and rear sections of said runners so that the sled may be folded or collapsed into compact form with the rear sections of the runners above the front sections and the folded members of said framework between them.

5. A sled, comprising laterally spaced runners, each formed of front and rear sections hinged together, means on said runners to support a rider, said means embracing a framework of members hinged together and to the front and rear sections of said runners so that the sled may be folded or collapsed into compact form with the rear sections of the runners above the front sections and the folded members of said framework between them, and a propulsion mechanism carried by said sled and formed to be folded and unfolded therewith.

6. A sled, comprising laterally spaced runners, each formed of front and rear sections hinged together, means on said runners to support a rider, said means embracing a framework of members hinged together and to the front and rear sections of said runners so that the sled may be folded or collapsed into compact form with the rear sections of the runners above the front sections and the folded members of said framework between them, and a propulsion mechanism carried by said sled and formed to be folded and unfolded therewith, said mechanism including a push bar and an operating rod therefor, said push bar operating between said runners.

7. A sled, comprising a pair of laterally spaced runners having hinged together front and rear sections, a framework on said runners and consisting of members hinged together and to said runner sections to lie between the latter when the sled is collapsed or folded with the rear sections over the front ones, a seat carried by said framework, a push bar to propel the sled, said bar engaging the underlying surface for the sled between the rear sections of said runners, said bar and rear runner sections having coacting means to guide the bar in its forward and backward movements, a rod pivoted to said framework in front of the seat and hinged at its upper end to said bar for actuating the same, and foot rests carried by the front sections of the runners forward of said framework.

8. A sled, comprising a pair of laterally spaced runners having hinged together front and rear sections, a framework on said runners consisting of hinged together forward, intermediate and rear members, said forward and rear members being hinged, respectively, to the front and rear runner sections so that the sled may be collapsed or folded into compact form with the folded framework between the runner sections when the rear ones are swung over the front ones, a seat carried by said rear members, a push bar forward of said seat and having at its lower end means to engage the underlying surface between the runners to propel the sled, said bar having lugs at its lower end engaging grooves in the rear runner sections to guide the bar in its forward and rearward movements, a rod pivoted to said forward members in front of the seat and hinged to said bar for operating the same, and foot rests carried by the front runner sections.

9. A sled, comprising a pair of laterally spaced runners having hinged together front and rear sections, means on said runners to support a rider, said means embracing a framework formed of members hinged together and to the front and rear sections of said runners so that the sled may be folded or collapsed into compact form with the rear sections of the runners over the front sections and the folded members of the framework between them, a propulsion mechanism carried by said sled and formed to be folded and unfolded therewith, foot rests carried by said sled, and means connecting said foot rests with said framework in a manner causing said foot rests to be swung into and out of positions on opposite sides of the sled as the latter is folded and unfolded.

10. A sled, comprising a collapsible or foldable rider support and runners having hinged together front and rear sections, a propulsion mechanism carried by said support, foot rests carried by the runners in front of said support, said foot rests being on opposite sides of the runners when in use, a cross-member with a yoke shaped mid-portion carried by said runners, rods carrying said foot rests and extending to said mid-portion, a plate pivoted to the mid-portion and having the inner ends of said rods pivoted thereto, and means connecting the plate with the support to move the pivotal point of the rods on opposite sides of said bar as the support is folded and unfolded in collapsing the sled to cause said foot rests to swing into and out of folded positions over said runners.

11. A sled, comprising a collapsible rider support and runners having hinged together front and rear sections, a propulsion mechanism carried by the support, a member with a loop shaped mid-portion extending across the forward sections of the runners in front of said support, a plate pivoted to said mid-portion, a pair of rods pivoted to said plate, foot rests carried at the outer ends of said rods and adapted to be swung into and out of positions on opposite sides of the runners, a link connected with said plate, a bar in front of said support and hinged at its upper and lower ends to the support and link, respectively, and spring means normally holding the foot rests on opposite sides of the runners when the sled is set up.

12. A sled, comprising runners, a rider support carried by said runners, said runners and support being formed of sections permitting the sled to be collapsed into compact form for carrying and packing, and a propulsion mechanism carried in part by the runners and in part by the rider support and formed to be opened up and collapsed therewith.

13. A sled, comprising runners, a rider support carried by said runners, said runners and support being formed of connected sections permitting the sled to be collapsed into compact form for carrying and packing, foot rests carried by said sled, and means connecting the foot rests therewith in a manner causing said rests to be swung into and out of positions on opposite sides of the sled as the latter is opened up and collapsed.

14. A sled, comprising runners, a rider support carried by said runners, said runners and support being formed of connected sections permitting the sled to be collapsed into compact form for carrying and packing, foot rests carried by said sled, means connecting the foot rests therewith in a manner causing said rests to be swung into and out of positions on opposite sides of the sled as the latter is opened up and collapsed, and a propulsion mechanism carried by said sled and formed to be opened up and collapsed therewith.

15. A sled, comprising runners, and a rider support carried by said runners, said runners and support each being formed of hinged together sections with certain of the sections of the support hinged to certain sections of the runners so that the sled may be collapsed into compact form for carrying and packing and be readily opened and set up for use by grasping certain of the sections and swinging them toward and from the others.

16. A sled, comprising runners, a rider support carried by said runners, said runners and support each being formed of hinged together sections with certain of the sections of the support hinged to certain sections of the runners so that the sled may be collapsed into compact form for carrying and packing and be readily opened and set up for use by grasping certain of the sections and swinging them toward and from the others, and a propulsion mechanism carried by the sled and formed to be opened up and collapsed therewith.

In testimony that I claim the foregoing as my invention, I affix my signature this 23rd day of January, A. D. 1923.

VICTOR H. WENZL.